United States Patent
Kinbara

(10) Patent No.: US 6,755,572 B1
(45) Date of Patent: Jun. 29, 2004

(54) ANTIFRICTION BEARING

(75) Inventor: Yoshihide Kinbara, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/129,543

(22) PCT Filed: Nov. 15, 1999

(86) PCT No.: PCT/JP99/06346
§ 371 (c)(1),
(2), (4) Date: May 8, 2002

(87) PCT Pub. No.: WO01/36832
PCT Pub. Date: May 25, 2001

(51) Int. Cl.$^7$ .............................................. F16C 33/10
(52) U.S. Cl. ..................... 384/462; 384/476; 384/488
(58) Field of Search ............................... 384/462, 480, 384/477, 488, 476

(56) References Cited

U.S. PATENT DOCUMENTS 6,109,794 A * 8/2000 Bertetti et al. .............. 384/462

FOREIGN PATENT DOCUMENTS

| JP | 1-307516 | 12/1989 |
| JP | 6-80956 | 11/1994 |
| JP | 7-127647 | 5/1995 |
| JP | 9-291943 | 11/1997 |

* cited by examiner

Primary Examiner—Lenard A. Footland
(74) Attorney, Agent, or Firm—Sughrue Mion, PLLC

(57) ABSTRACT

A rolling bearing of the present invention constructs a current passing structure by fixing a current passing plate 12 fixed to an outer peripheral portion of an inner ring 1a and a current passing sealing plate 10 having a U-shaped sectional shape, whose opening portion is directed inwardly, to the inside of an outer ring 2a so as to surround a current passing plate 12 on a side surface of this U-shaped sectional shape and then sealing a conductive grease 11 into the inside of this U-shaped sectional shape.

5 Claims, 6 Drawing Sheets

ANTIFRICTION BEARING

TECHNICAL FIELD

The present invention relates to a rolling bearing and, more particularly, a rolling bearing in which a current can be passed between the inner ring and the outer ring, that are rotated relatively.

BACKGROUND ART

Normally, in case the motor is driven by the sinusoidal wave of the commercial power supply, the electrolytic corrosion of the rolling bearing due to the charges that are generated in the rotating shaft of the rotor is not caused. Thus, it is the existing circumstances that no countermeasure for the electrolytic corrosion of the bearing is taken.

However, in the case that the motor is driven by using the inverter unit, the rotor is brought into the state that it is floated electrically over the stator, and thus the charges are generated in the rotating shaft by the harmonics and the electrostatic capacity. Then, the accumulated charges can be discharged only via the rolling bearing as the support point of the rotating shaft. Thus, the charges are discharged from inner ring of the rolling bearing to the outer ring via the rolling elements to electrolytically corrode the race surfaces.

For this reason, there is proposed the rolling bearing that can prevent the electrolytic corrosion by connecting the rotating shaft and the structural body such as the bracket, etc., that holds the rolling bearing, via the rolling bearing, that is made electrically conductive, such that the charges accumulated in the rotating shaft of the rotor are caused to escape to the structural body such as the bracket.

FIG. 5 is a sectional view of the rolling bearing in the prior art, that is set forth in the Unexamined Japanese Patent Application Publication No. Hei1-307516. In FIG. 5, in the rolling bearing 30, the balls (rolling elements) 33 arranged between the inner ring 31 and the outer ring 32 are held by the holders 34, 34, and the sealing member 35 is spread between the inner ring and the outer ring in the situation that the lubricating grease containing the carbon black to have the conductivity is filled between the inner ring 31 and the outer ring 32. Also, the raceway surface 31a of the inner ring 31 has a radius larger than the balls 33, and the clearance 36 between the balls 33 and the raceway surface 31a of the inner ring 31 acts as the grease guiding means.

The lubricating grease containing the carbon black to have the conductivity is filled between a pair of races that guide the balls 33 held by the holders 34, and such lubricating grease is sealed by the sealing member 35, and the grease containing the carbon black is guided to the raceway surfaces of the races as it is by the grease guiding means 36, so that the contact to the balls 33 with the conductivity can be accomplished.

In the above rolling bearing, there is the problem that, since the lubricating grease containing the carbon black to have the conductivity is employed, such grease is inferior in lubricity and life to the normal lubricating grease.

FIG. 6 is a sectional view of the rolling bearing in the prior art, that is set forth in the Unexamined Japanese Patent Application Publication No. Hei9-291943. In FIG. 6, 40 is the rolling bearing, 41 is the metal inner ring for rotatably supporting the rotating shaft (not shown), 42 is the rolling element such as the steel ball, etc., 43 is the metal outer ring held to the structural body such as the bracket (not shown), etc., 44 is the sealing member formed of the conductive flexible member that comes in contact with the inner ring 41 and the outer ring 43 to cover the rolling elements 42 from both ends away therefrom, and 45 is the lubricating grease for lubricating the rolling surfaces of the inner ring 41 and the outer ring 43.

Since the inner ring 41 and the outer ring 43 are brought into contact with each other via the sealing member 44 formed of the conductive flexible member, the charges generated in the rotating shaft (not shown) are caused to escape from the inner ring 41 to the structural body such as the bracket (not shown), etc. via the sealing member 44 and the outer ring 43.

In the above rolling bearing, since the sealing member 44 formed of the conductive flexible member is brought into contact with the inner ring 41 and the outer ring 43 by the spring force of the flexible member, there is the problem in aspects of wear and dustproof property.

The present invention is made to overcome above problems, and it is an object of the present invention is to get a rolling bearing having lubricity and life that are equivalent to those of the normal rolling bearing using the lubricating grease and having conductivity between an inner ring and an outer ring.

DISCLOSURE OF THE INVENTION

A rolling bearing of the present invention which has a metal inner ring for rotatably supporting a rotating shaft, a metal outer ring held in a structural body such as a bracket, and rolling elements arranged between the inner ring and the outer ring and in which a grease for lubricating rolling surfaces of the inner ring and the outer ring is sealed, the rolling bearing has a current passing sealing structure which comprises a first current passing plate fitted to an end portion of the inner ring, and a second current passing plate fitted to an end portion of the outer ring, and in which a conductive grease is sealed between the first current passing plate and the second current passing plate.

Also, the current passing sealing structure is constructed such that the second current passing plate is formed to have a U-shaped sectional shape whose opening portion is directed to an inner ring side, the first current passing plate is arranged on an inside of the U-shaped sectional shape, and the conductive grease is sealed in the inside of the U-shaped sectional shape.

Also, the current passing sealing structure is constructed such that the second current passing plate includes two current passing plates arranged on both sides of the first current passing plate, and the conductive grease is sealed in a space formed between two current passing plates.

Also, a rolling bearing which has a metal inner ring for rotatably supporting a rotating shaft, a metal outer ring held in a structural body such as a bracket, rolling elements arranged between the inner ring and the outer ring, a grease for lubricating rolling surfaces of the inner ring and the outer ring is sealed, and a sealing plate for sealing the grease, the rolling bearing has a current passing sealing structure which comprises a first current passing plate fitted to be put between an end portion of the inner ring and a contact surface of stepped portions of the rotating shaft, a second current passing plate fitted to the sealing plate to surround the first current passing plate by putting between the outer ring and an inside of the bracket, and a conductive grease sealed into a space between the second current passing plate and the sealing plate.

BEST MODES FOR CARRYING OUT THE INVENTION

Embodiment 1

Figure 1:
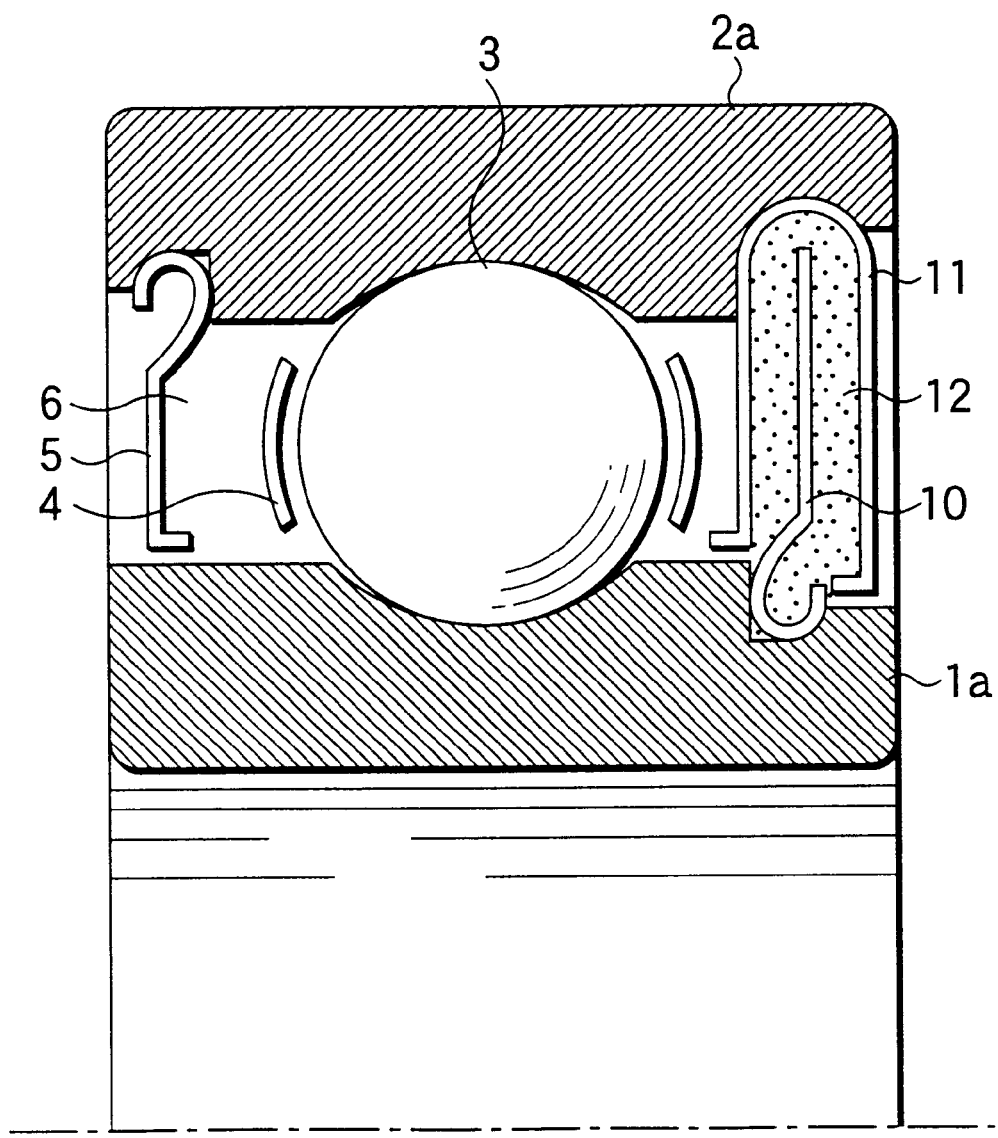
FIG. 1 is a sectional view of a rolling bearing according to an embodiment 1 of the present invention.

FIG. 1 is a sectional view of a rolling bearing according to an embodiment 1 of the present invention. In FIG. 1, 1a is a metal inner ring for rotatably supporting a rotating shaft (not shown), 2a is a metal outer ring held in a structural body such as the bracket (not shown), etc., 3 is a rolling element such as a steel ball, etc., 4 is a holder for holding the rolling elements 3 arranged between the inner ring 1a and the outer ring 2a, and 5 is a sealing plate provided to an end portion of the outer ring 2a on both sides of the rolling elements 3 to tightly seal a space between the inner ring 1a and the outer ring 2a. Also, 6 is a lubricating grease sealed into a space formed by the sealing plate 5 to lubricate rolling surfaces of the inner ring 1a and the outer ring 2a. For example, there is Marutemp SRL manufactured by Kyodo Yushi Co., Ltd.

Also, 10 is a first current passing plate which has a resilience by the folded shape of the concentric inner diameter portion and that is put into a groove formed on an outer peripheral portion of the inner ring 1a and 11 is a second current passing plate which has a U-shaped sectional shape whose opening portion is directed to the inner ring side and a bottom side portion of this U-shaped sectional shape is put into the groove of the inner peripheral portion of the outer ring 2a. Also, the first current passing plate 10 is arranged on the inside of the U-shaped sectional shape of the second current passing plate 11. Also, 12 is a grease that is sealed into the inside of the second current passing plate 11 and has a conductivity (referred to as a "conductive grease" hereinafter). As the conductive grease 12, there is Marutemp ELK manufactured by Kyodo Yushi Co., Ltd., for example, which can obtain the conductivity by mixing the carbon black into the grease.

The charges generated in the rotator (not shown) of the motor are guided to the structural body (not shown) such as the bracket, etc. via the inner ring 1a into which the rotating shaft (not shown) is inserted→the first current passing plate 10→the conductive grease 12→the second current passing plate 11→the outer ring 2a.

In this embodiment, the inner ring 1a and the outer ring 2a are in the non-contact state. However, since the current passing sealing structure for passing the current between the inner ring 1a and the outer ring 2a is constructed by arranging the first current passing plate 10, that is fitted to the end portion of the inner ring 1a, on the inside of the U-shaped sectional shape of the second current passing plate 11, that is fitted to the end portion of the outer ring 2a, and then sealing the conductive grease 12 between the first current passing plate 10 and the second current passing plate 11, the electrolytic corrosion of the rolling bearing can be prevented. Also, since not the conductive grease 12 but the lubricating grease 6 used in the normal rolling bearing can be used to lubricate the rolling elements 3, the rolling bearing having the good lubricity and the long life can be obtained.

In addition, as the method of fitting the first current passing plate and the second current passing plate in the above, there is shown the example in which the first current passing plate, to which the resilience is given by the folded shape of the concentric inner diameter portion, is put into the groove of the outer peripheral portion of the inner ring 1a and also the bottom side portion of the second current passing plate 11, which has the U-shaped sectional shape, is put into the groove of the inner peripheral portion of the outer ring 2a. In this case, the current passing plate may be fitted to the inner ring or the outer ring by using the O-ring, otherwise the first current passing plate formed as the concentric plate member may be screwed into the end portion of the inner ring.

Embodiment 2

Figure 2:
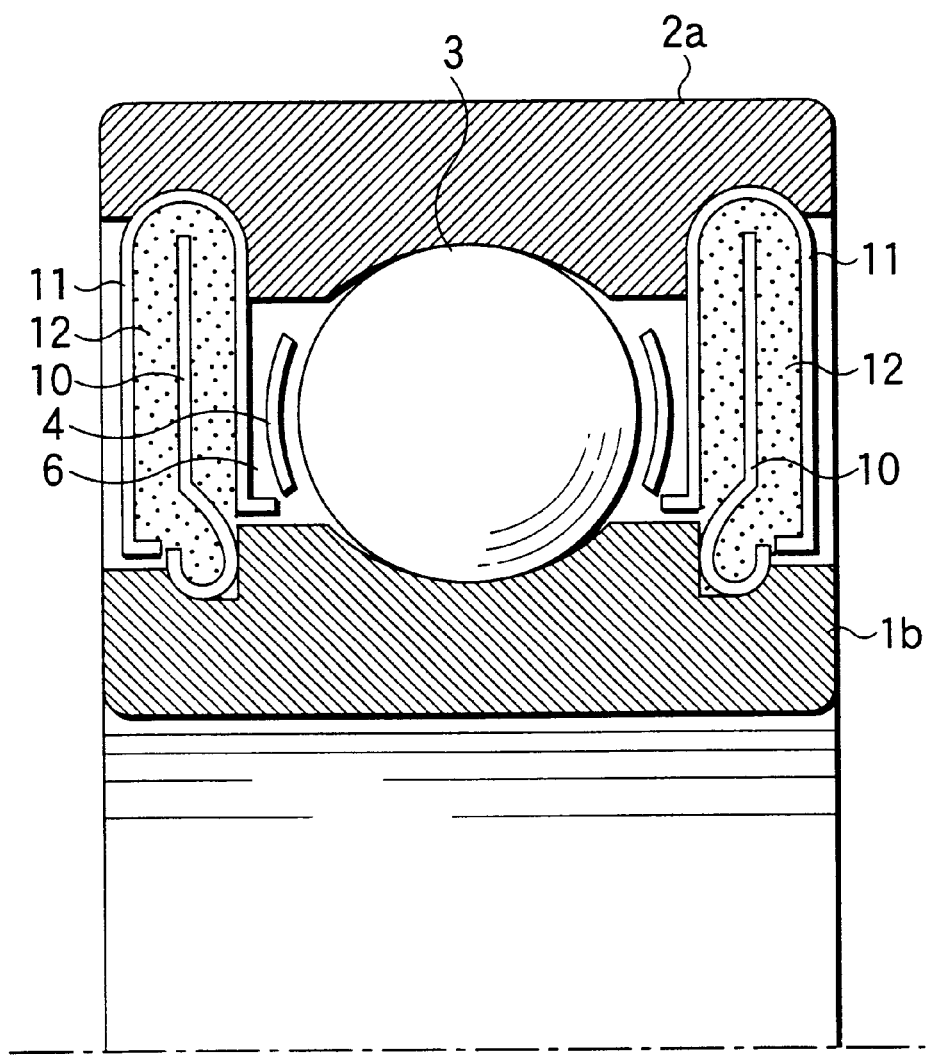
FIG. 2 is a sectional view of a rolling bearing according to an embodiment 2 of the present invention.

FIG. 2 is a sectional view of a rolling bearing according to an embodiment 2 of the present invention. In FIG. 2, references 3, 4, 6, 10 to 12 are similar to those in above FIG. 1 and therefore their explanation will be omitted. Also, 1b is a metal inner ring for rotatably supporting the rotating shaft (not shown), and 2b is a metal outer ring held in the structural body such as the bracket (not shown), etc.

In the rolling bearing according to this embodiment, the current passing structure including the first current passing plate 10, the second current passing plate 11, and the conductive grease 12 is provided on both sides of the rolling bearing. Thus, the conductivity between the inner ring and the outer ring can be enhanced, and also the electrolytic corrosion of the rolling bearing can be prevented without fail.

Embodiment 3

Figure 3:
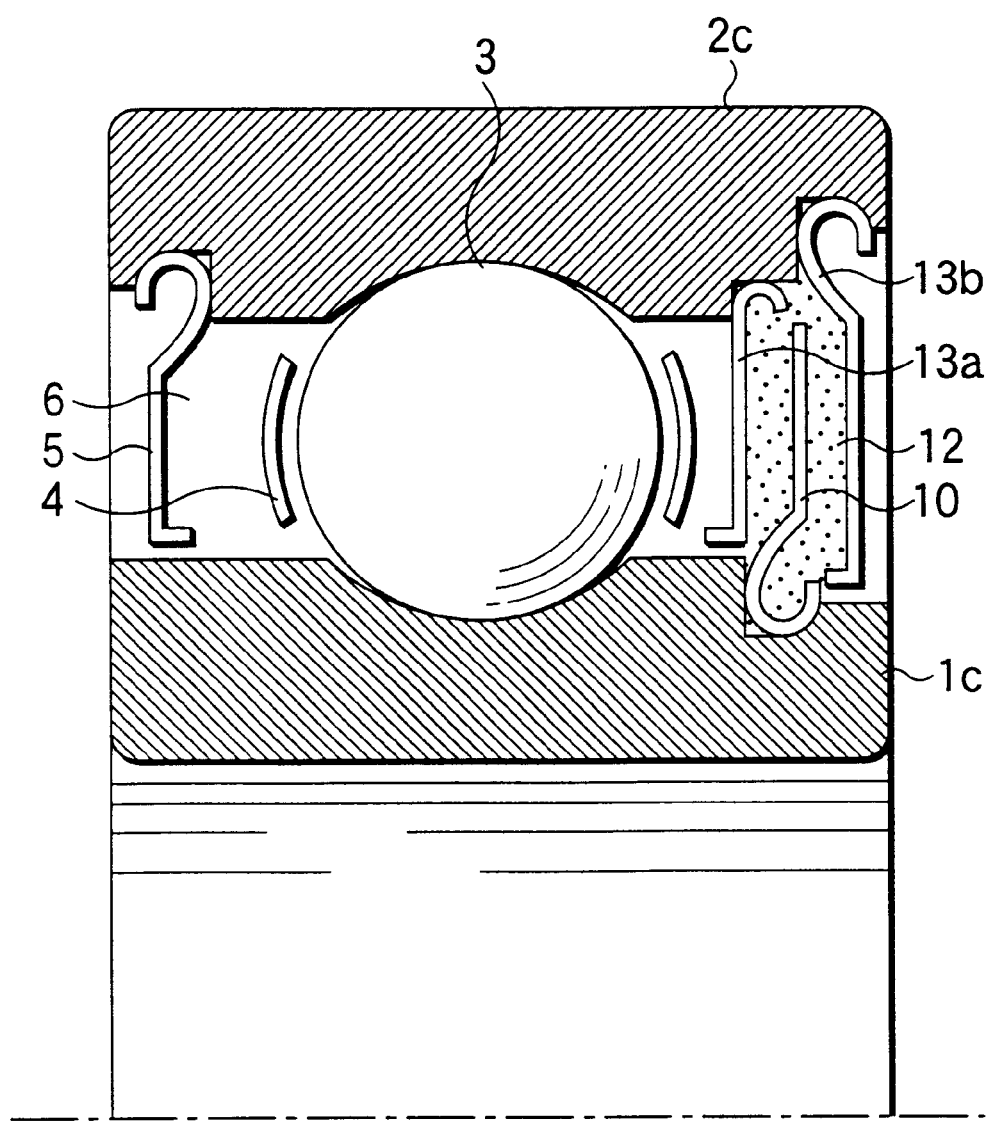
FIG. 3 is a sectional view of a rolling bearing according to an embodiment 3 of the present invention.

FIG. 3 is a sectional view of a rolling bearing according to an embodiment 3 of the present invention. In FIG. 3, references 3 to 6, 10, 12 are similar to those in above FIG. 1 and therefore their explanation will be omitted. Also, 1c is a metal inner ring for rotatably supporting the rotating shaft (not shown), and 2c is a metal outer ring held in the structural body such as the bracket (not shown), etc., and 13a, 13b are current passing plates, to which the resilience is given by the folded shape of the concentric outer diameter portion and which are put into the groove of the inner peripheral portion of the outer ring 2c such that they are arranged on both sides of the first current passing plate 10. Also, the conductive grease 12 is sealed into a space formed by the current passing plates 13a, 13b.

In this embodiment, the current passing plates 13a, 13b are arranged on both sides of the first current passing plate 10 fitted to the inner ring, and then two current passing plates 13a, 13b and the inner peripheral portion of the outer ring 2c between the grooves of the inner peripheral portion of the outer ring 2c, that are put into the current passing plates 13a, 13b, are used instead of the second current passing plate 11 having the U-shaped sectional shape in FIG. 1. Therefore, since the current passing sealing structure can be constructed by assembling the current passing plate 13a, the first current passing plate 10, and the current passing plate 13b in this order, the rolling bearing having the current passing sealing structure can be manufactured inexpensively.

Also, the example in which the current passing sealing structure is provided to one side of the rolling bearing is shown in FIG. 3. If the current passing sealing structure is provided to both sides of the rolling bearing, the conductivity between the inner ring and the outer ring can be enhanced much more.

In addition, as the method of fitting the first current passing plate and the second current passing plate in the above, there is shown the example in which the first current passing plate, to which the resilience is given by the folded shape of the concentric inner diameter portion, is put into the groove of the outer peripheral portion of the inner ring 1a and also two current passing plates 13a, 13b, to which the resilience is given by the folded shape of the concentric outer diameter portion, are put into two grooves of the inner peripheral portion of the outer ring 2c. In this case, the first current passing plate or two current passing plates may be formed as the concentric plate member, and the current passing plate may be fitted to the inner ring or the outer ring by screwing into the end portion of the inner ring or using the O-ring.

Embodiment 4

Figure 4:
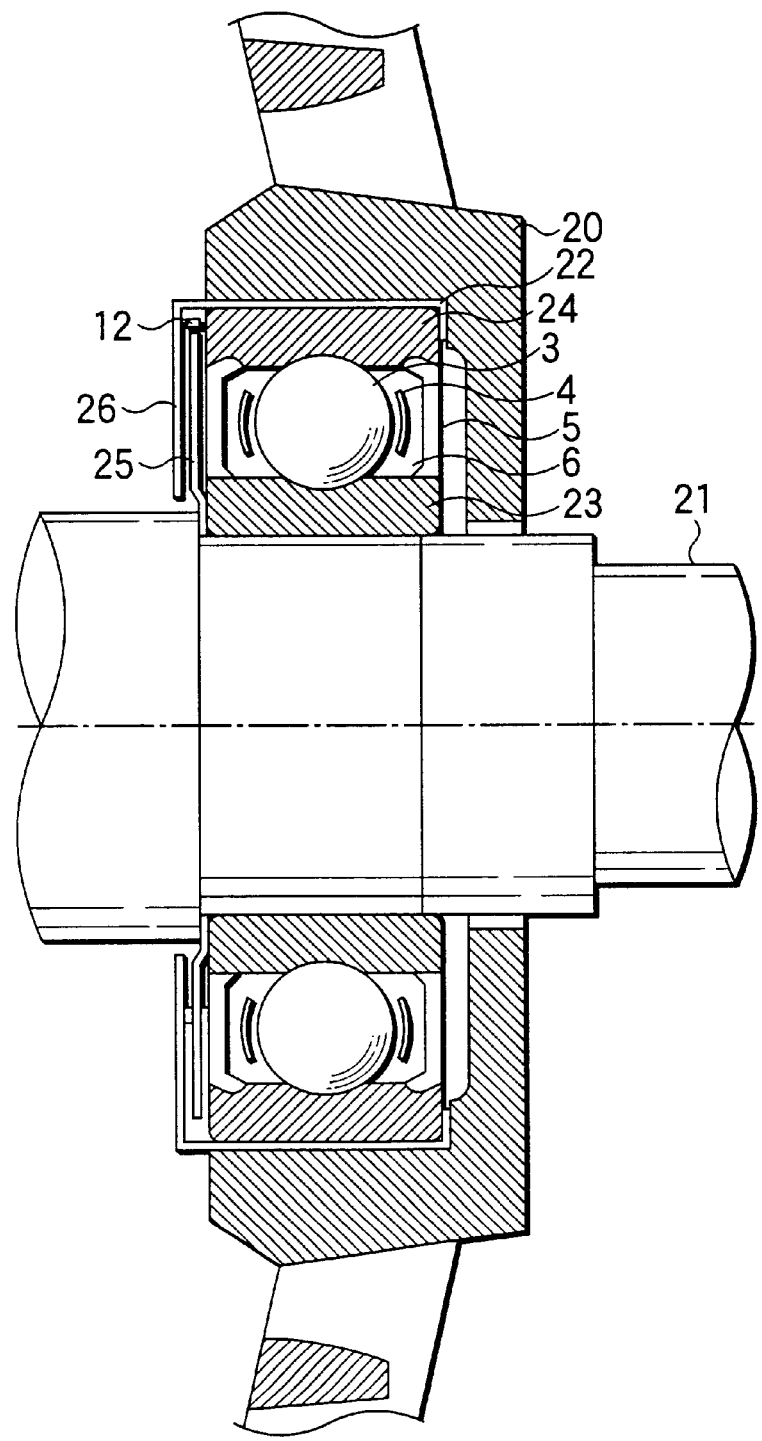
FIG. 4 is a view showing a configuration of a bearing portion according to an embodiment 4 of the present invention.
Figure 5:
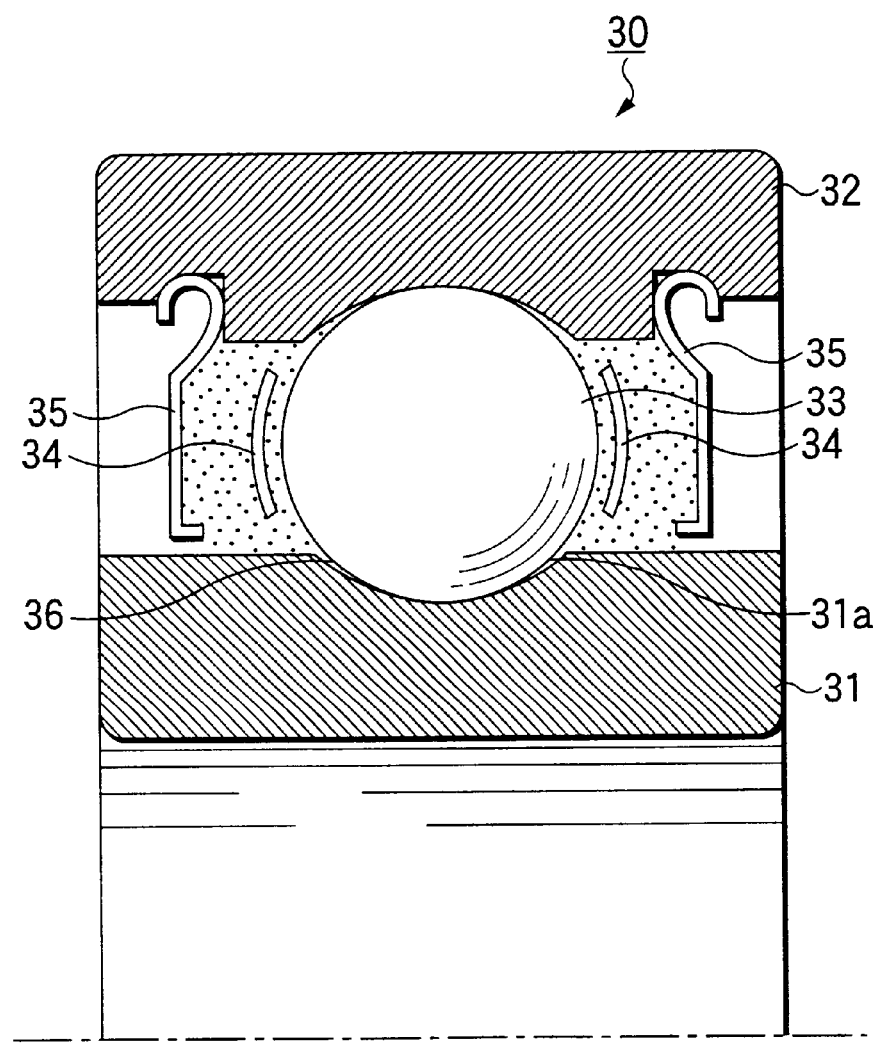
FIG. 5 is a sectional view of the rolling bearing in the prior art, that is set forth in the Unexamined Japanese Patent Application Publication No. Hei1-307516.
Figure 6:
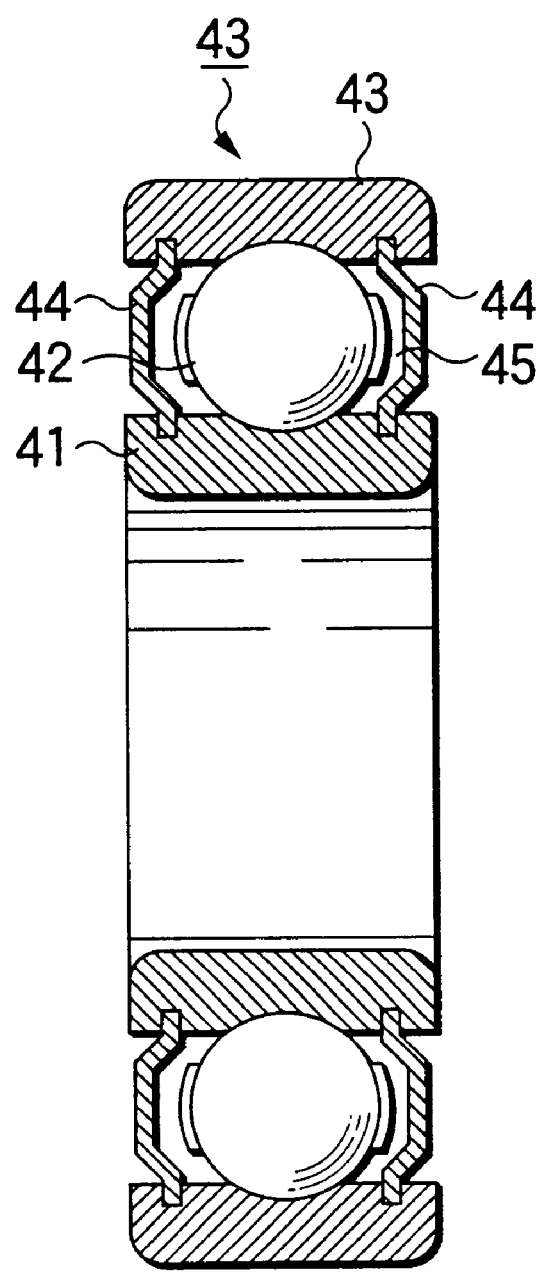
FIG. 6 is a sectional view of the rolling bearing in the prior art, that is set forth in the Unexamined Japanese Patent Application Publication No. Hei9-291943.

FIG. 4 is a view showing a configuration of a bearing portion according to an embodiment 4 of the present invention. In FIG. 4, references 3 to 6, 12 are similar to those in above FIG. 1 and therefore their explanation will be omitted. Also, 20 is a bracket as the structural body, 21 is a rotating shaft, 22 is a rolling bearing, 23 is a metal inner ring for rotatably supporting the rotating shaft 21, and 24 is a metal outer ring held in the structural body such as the bracket 20, etc., 25 is a first current passing plate supported onto the end portion of the inner ring 23, and 26 is a second current passing plate fixed to the end portion of the outer ring 24.

The first current passing plate 25 is fitted to put between the end portion of the inner ring 23 of the rolling bearing 22 and the contact surface of the stepped portion of the rotating shaft 21, and the second current passing plate 26 is put between the outer ring 24 of the rolling bearing 22 and the bracket 20 and is fitted to surround the first current passing plate 25 by the sealing plate 5 and the second current passing plate 26, and the conductive grease 12 is sealed between the sealing plate 5 and the second current passing plate 26, whereby the current can be passed between the rotating shaft 21 and the bracket 20.

In this embodiment, the current passing sealing structure is constructed by adding the first current passing plate 25, the second current passing plate 26, and the conductive grease 12 to the normally employed rolling bearing 22. Therefore, the electrolytic corrosion of the rolling bearing can be prevented more inexpensively.

Industrial Applicability

As described above, the rolling bearing according to the present invention is suitable for the rolling bearing employed in the motor that is driven by the inverter unit.

What is claimed is:

1. A rolling bearing which has a metal inner ring for rotatably supporting a rotating shaft, a metal outer ring held in a structural body such as a bracket, and rolling elements arranged between said inner ring and said outer ring and in which a grease for lubricating rolling surfaces of said inner ring and said outer ring is sealed, said rolling bearing having:
a current passing sealing structure which comprises a metal first current passing plate fitted to an end portion of an outer circumference of said inner ring, and a metal second current passing plate fitted to an end portion of an inner circumference of said outer ring, and in which a conductive grease is sealed between said metal first current passing plate and said metal second current passing plate,
wherein said metal first current passing plate fits into a groove of said inner ring.

2. A rolling bearing which has a metal inner ring for rotatably supporting a rotating shaft, a metal outer ring held in a structural body such as a bracket, and rolling elements arranged between said inner ring and said outer ring and in which a grease for lubricating rolling surfaces of said inner ring and said outer ring is sealed, said rolling bearing having:
a current passing sealing structure which comprises a first current passing plate fitted to an end portion of an outer circumference of said inner ring, and a second current passing plate fitted to an end portion of an inner circumference of said outer ring, and in which a conductive grease is sealed between said first current passing plate and said second current passing plate,
wherein said current passing sealing structure is constructed such that said second current passing plate is formed to have a U-shaped sectional shape whose opening portion is directed to an inner ring side,
said first current passing plate is arranged on an inside of the U-shaped sectional shape, and
said conductive grease is sealed in the inside of the U-shaped sectional shape.

3. A rolling bearing which has a metal inner ring for rotatably supporting a rotating shaft, a metal outer ring held in a structural body such as a bracket, and rolling elements arranged between said inner ring and said outer ring and in which a grease for lubricating rolling surfaces of said inner ring and said outer ring is sealed, said rolling bearing having:
a current passing sealing structure which comprises a first current passing plate fitted to an end portion of an outer circumference of said inner ring, and a second current passing plate fitted to an end portion of an inner circumference of said outer ring, and in which a conductive grease is sealed between said first current passing plate and said second current passing plate,
wherein said current passing sealing structure is constructed such that said second current passing plate includes two current passing plates arranged on both sides of said first current passing plate, and said conductive grease is sealed in a space formed between two current passing plates.

4. A rolling bearing which has a metal inner ring for rotatably supporting a rotating shaft, a metal outer ring held in a structural body such as a bracket, rolling elements arranged between said inner ring and said outer ring, a grease for lubricating rolling surfaces of said inner ring and said outer ring is sealed, and a sealing plate for sealing said grease, said rolling bearing having:
a current passing sealing structure which comprises a first current passing plate fitted to be put between an end portion of said inner ring and a contact surface of stepped portions of said rotating shaft, a second current passing plate fitted to said sealing plate to surround said first current passing plate by putting between said outer ring and an inside of said bracket, and a conductive grease sealed into a space between said second current passing plate and said sealing plate.

5. A rolling bearing which has a metal inner ring for rotatably supporting a rotating shaft, a metal outer ring held in a structural body such as a bracket, and rolling elements arranged between said inner ring and said outer ring and in which a grease for lubricating rolling surfaces of said inner ring and said outer ring is sealed, said rolling bearing having:

a current passing sealing structure which comprises a metal first current passing plate fitted to an end portion of an outer circumference of said inner ring, and a metal second current passing plate fitted to an end portion of an inner circumference of said outer ring, and in which a conductive grease is sealed between said metal first current passing plate and said metal second current passing plate, wherein said metal second current passing plate fits into a groove of said inner outer ring.

* * * * *